United States Patent
Sauer et al.

(10) Patent No.: US 11,832,050 B2
(45) Date of Patent: Nov. 28, 2023

(54) ZEOLITIC MATERIAL FOR IMPROVING LOUDSPEAKER PERFORMANCE

(71) Applicant: Apple Inc., Cupertino, CA (US)

(72) Inventors: Juergen Sauer, Munich (DE); Andrey Gavryushin, Germering (DE)

(73) Assignee: Apple Inc., Cupertino, CA (US)

( * ) Notice: Subject to any disclaimer, the term of this patent is extended or adjusted under 35 U.S.C. 154(b) by 1383 days.

(21) Appl. No.: 16/136,216

(22) Filed: Sep. 19, 2018

(65) Prior Publication Data

US 2020/0092636 A1  Mar. 19, 2020

(51) Int. Cl.
| | |
|---|---|
| *H04R 1/28* | (2006.01) |
| *B01D 53/04* | (2006.01) |
| *H04R 1/02* | (2006.01) |
| *G06F 1/06* | (2006.01) |
| *G06F 1/16* | (2006.01) |

(52) U.S. Cl.
CPC ............ *H04R 1/288* (2013.01); *B01D 53/04* (2013.01); *G06F 1/1605* (2013.01); *H04R 1/02* (2013.01); *B01D 2253/108* (2013.01); *H04R 2201/029* (2013.01)

(58) Field of Classification Search
CPC .... B01D 53/04; B01D 2253/108; B01J 20/02; B01J 20/16; B01J 20/28016; G06F 1/1605; G06F 1/1688; H04M 1/035; H04R 1/02; H04R 1/2803; H04R 1/288; H04R 9/025; H04R 9/06; H04R 1/2888; H04R 2201/029; H04R 2400/11; H04R 2499/13
See application file for complete search history.

(56) References Cited

U.S. PATENT DOCUMENTS

| | | |
|---|---|---|
| 4,793,980 A | 12/1988 | Torobin |
| 9,099,073 B2 | 8/2015 | Papakyriacou et al. |
| 9,607,597 B2 * | 3/2017 | Qian .................... G10K 11/165 |

(Continued)

FOREIGN PATENT DOCUMENTS

| | | |
|---|---|---|
| CN | 103098490 | 5/2013 |
| CN | 103477655 | 12/2013 |

(Continued)

OTHER PUBLICATIONS

Notification of Third Office Action for Chinese Application No. 201910766342.7 dated Jul. 21, 2021, 6 pages.

(Continued)

*Primary Examiner* — Carolyn R Edwards
*Assistant Examiner* — Julie X Dang
(74) *Attorney, Agent, or Firm* — Aikin & Gallant, LLP

(57) ABSTRACT

Aspects are disclosed of an apparatus comprising an assemblage of beads. The assemblage includes a plurality of beads formed from a zeolite and a polymeric binder. At least one bead in the plurality of beads has a shape including a base shape having a continuous exterior formed of a first dome portion and a second dome portion, the first and second dome portions being joined together to form a spheroid with a polar axis, a polar dimension along the polar axis, and a transverse dimension normal to the polar axis, and an indentation formed in one of the first and second domed portions, the indentation having a depth and extending toward a center of the base shape along and in the direction of the polar axis and a width in the direction normal to the polar axis.

31 Claims, 11 Drawing Sheets

(56) References Cited

U.S. PATENT DOCUMENTS

| | | | |
|---|---|---|---|
| 9,615,165 B2 | 4/2017 | Herold et al. | |
| 9,635,455 B2 | 4/2017 | Schöffmann et al. | |
| 9,712,913 B2 | 7/2017 | Lembacher et al. | |
| 9,723,400 B2 | 8/2017 | Herold et al. | |
| 9,744,519 B2 * | 8/2017 | Lutz | B01J 35/002 |
| 2009/0028370 A1 | 1/2009 | Matsumura et al. | |
| 2011/0020225 A1 * | 1/2011 | Chung | A61K 9/5031 |
| | | | 424/9.1 |
| 2013/0308812 A1 | 11/2013 | Shen | |
| 2014/0138592 A1 * | 5/2014 | Nakamura | A61P 17/00 |
| | | | 252/582 |
| 2015/0068402 A1 | 3/2015 | Lin | |
| 2015/0152251 A1 * | 6/2015 | Koshida | C04B 35/628 |
| | | | 241/3 |
| 2016/0345090 A1 * | 11/2016 | Wilk | B01D 53/04 |
| 2017/0013350 A1 * | 1/2017 | Sauer | B01J 20/28004 |
| 2017/0041704 A1 * | 2/2017 | Herold | H04R 1/2811 |
| 2017/0064438 A1 * | 3/2017 | Wilk | H04R 1/2811 |
| 2018/0146282 A1 | 5/2018 | Lembacher et al. | |
| 2019/0016643 A1 * | 1/2019 | Stolzenburg | C04B 35/63444 |

FOREIGN PATENT DOCUMENTS

| | | |
|---|---|---|
| CN | 104830018 | 2/2015 |
| CN | 105195061 | 12/2015 |
| CN | 106488365 | 3/2017 |
| CN | 107500604 | 12/2017 |
| CN | 107534808 | 1/2018 |
| CN | 107592973 | 1/2018 |
| CN | 107708040 | 2/2018 |
| CN | 210183532 | 3/2020 |
| EP | 1786235 | 6/2018 |
| KR | 20160019089 | 2/2016 |

OTHER PUBLICATIONS

Notification of First Office Action and Search Report for Chinese Application No. 202110531573.7 dated May 25, 2022, 12 pages.
Evaluation Report for Utility Model Patent for Chinese Patent No. ZL2019213583637 dated Jun. 1, 2020, 14 pages.
Notification of Second Office Action for Chinese Application No. 201910766342.7 dated Mar. 18, 2021, 7 pages.
Office Action for Chinese Application No. 201910766342.7 dated Sep. 3, 2020, 7 pages.
Notification of Second Office Action for Chinese Application No. 202110531573.7 dated Nov. 30, 2022, 8 pages.
Notification of Fourth Office Action for Chinese Application No. 202110531573.7, dated Aug. 25, 2023, 25 pages.

* cited by examiner

ZEOLITIC MATERIAL FOR IMPROVING LOUDSPEAKER PERFORMANCE

TECHNICAL FIELD

The disclosed aspects relate generally to zeolitic materials and in particular, but not exclusively, to zeolitic materials that can be used to improve loudspeaker performance.

BACKGROUND

Loudspeakers include a back volume and a membrane or diaphragm that oscillates and emits sound when driven by an electromagnetic transducer. A variety of different forces act on the membrane while it is being moved, distorting its intended acceleration by the electromagnet and thus distorting the sound wave it emits. Reduction of these additional membrane forces leads to improved sound quality.

One of the forces acting on the membrane results from pressure fluctuations in the back volume due to compression and decompression of air by the moving membrane. These pressure fluctuations can be leveled down by increasing the space of the back volume—e.g. making it larger. But in hand-held devices such as cell phones, increasing the size of the back volume is possible only to a minor degree because these devices should be kept conveniently small.

SUMMARY

Aspects are described of an apparatus comprising an assemblage of beads. The assemblage includes a plurality of beads formed from a zeolite and a polymeric binder. At least one bead in the plurality of beads has a shape including a base shape having a continuous exterior formed of a first dome portion and a second dome portion, the first and second dome portions being joined together to form a spheroid with a polar axis, a polar dimension along the polar axis, and a transverse dimension normal to the polar axis. An indentation is formed in one of the first and second domed portions. The indentation has a depth and extends toward a center of the base shape along and in the direction of the polar axis. The polar dimension is a polar diameter and the depth of the indentation is between 5% and 50% of the polar diameter, or the transverse dimension is a transverse diameter and the width of the indentation is between 5% and 35% of the transverse diameter.

Aspects are described of an audio speaker. The audio speaker includes a housing defining a back volume behind a speaker driver, wherein the speaker driver can convert an electrical audio signal into a sound so that the sound can propagate through a gas in the back volume. A permeable partition divides the back volume into a rear cavity defined between the speaker driver, the housing, and the permeable partition and an adsorption cavity defined between the housing and the permeable partition. The permeable partition includes a plurality of holes that place the rear cavity in fluid communication with the adsorption cavity to allow the gas to flow between the rear cavity and the adsorption cavity. An adsorptive filler is positioned in the adsorption cavity to adsorb the gas. The adsorptive filler comprising an assemblage of beads. The assemblage includes a plurality of beads formed from a zeolite and a polymeric binder. At least one bead in the plurality of beads has a shape including a base shape having a continuous exterior formed of a first dome portion and a second dome portion, the first and second dome portions being joined together to form a spheroid with a polar axis, a polar dimension along the polar axis, and a transverse dimension normal to the polar axis. An indentation is formed in one of the first and second domed portions. The indentation has a depth and extends toward a center of the base shape along and in the direction of the polar axis. The polar dimension is a polar diameter and the depth of the indentation is between 5% and 50% of the polar diameter, or the transverse dimension is a transverse diameter and the width of the indentation is between 5% and 35% of the transverse diameter.

Aspects are described of a method for manufacturing of an assemblage of particles. The method includes preparing an aqueous suspension by dispersing a zeolite powder in water, adding a polymer binder to the suspension and mixing to form a zeolite-polymer suspension, and adding hydrogen peroxide (H2O2) to the zeolite-polymer suspension. Droplets of the zeolite-polymer suspension are produced by forcing the zeolite-polymer suspension through a nozzle, and the droplets of the zeolite-polymer suspension emerging from the nozzle are frozen.

BRIEF DESCRIPTION OF THE DRAWINGS

Non-limiting and non-exhaustive aspects of the present invention are described with reference to the following figures, wherein like reference numerals refer to like parts throughout the various views unless otherwise specified.

FIG. 4A is a perspective view, FIG. 4B a side view, FIG. 4C a top view, and FIG. 4D a bottom view.

DETAILED DESCRIPTION

The disclosure below describes aspects of a zeolitic material for improving loudspeaker performance, a method of making the zeolitic material, and a loudspeaker using the zeolitic material. Specific details are described to provide an understanding of the disclosed aspects, but one skilled in the art will recognize that the invention can be practiced without one or more of the described details or with other methods, components, materials, etc. In some instances, well-known structures, materials, or operations are not shown or described in detail but are nonetheless encompassed within the scope of the invention.

Reference throughout this specification to "one aspect" or "an aspect" means that a described feature, structure, or characteristic can be included in at least one described aspect, so that appearances of "in one aspect" or "in an aspect" do not necessarily all refer to the same aspect. Furthermore, the particular features, structures, or characteristics can be combined in any suitable manner in one or more aspects.

One approach to reducing back volume pressure fluctuations for handheld devices is to place absorbent materials like carbon black or zeolites into the back volumes. It has been shown that such materials can virtually increase the back volume—in other words, their presence in the back volume enhances loudspeaker performance as if the speaker's back volume had been made bigger.

Loudspeaker

Figure 1:
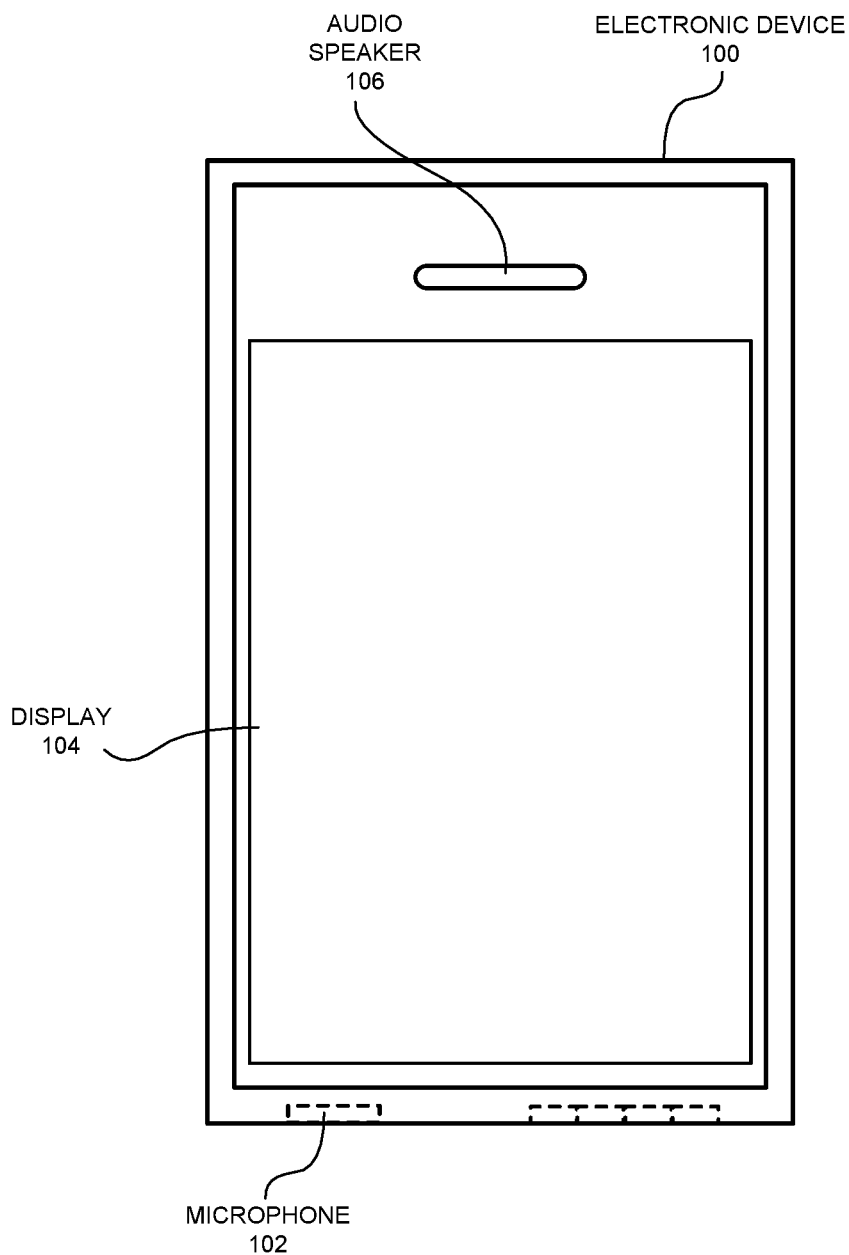
FIG. 1 is a pictorial view of an aspect of an electronic device.

FIG. 1 illustrates an aspect of an electronic device 100. Electronic device 100 can be a smartphone device in one aspect, but in other aspects can be any other portable or stationary device or apparatus, such as a laptop computer or a tablet computer. Electronic device 100 can include various capabilities to allow the user to access features involving, for example, calls, voicemail, music, e-mail, internet browsing, scheduling, and photos. Electronic device 100 can also include hardware to facilitate such capabilities. For example, an integrated microphone 102 can pick up the voice of a user during a call, and an audio speaker 106, e.g., a micro loudspeaker, can deliver a far-end voice to the near-end user during the call. Audio speaker 106 can also emit sounds associated with music files played by a music player application running on electronic device 100. A display 104 can present the user with a graphical user interface to allow the user to interact with electronic device 100 and/or applications running on electronic device 100. Other conventional features are not shown but can of course be included in electronic device 100.

Figure 2A:
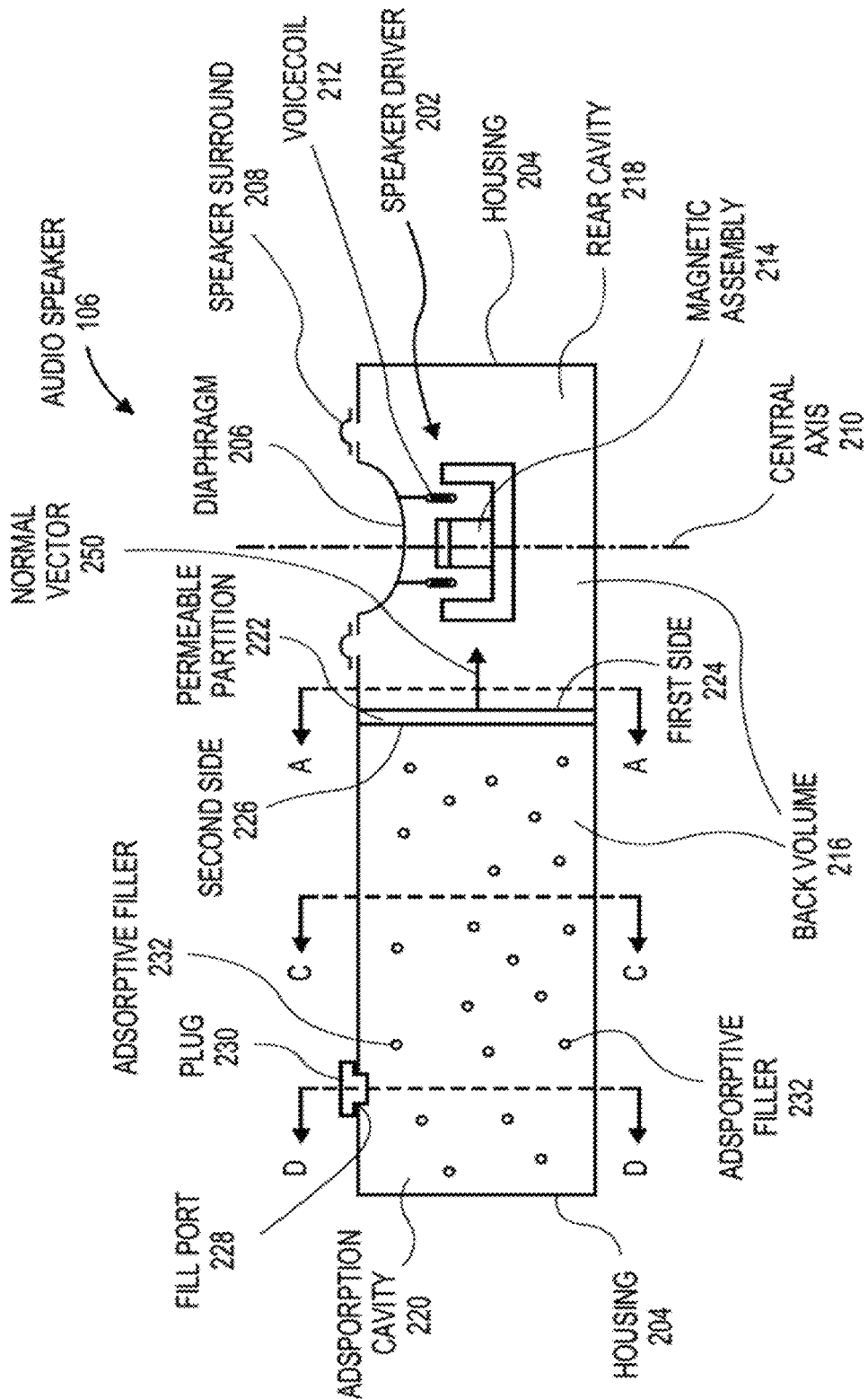
FIGS. 2A-2B are sectional views of aspects of an audio micro-loudspeaker for an electronic device.
Figure 2B:
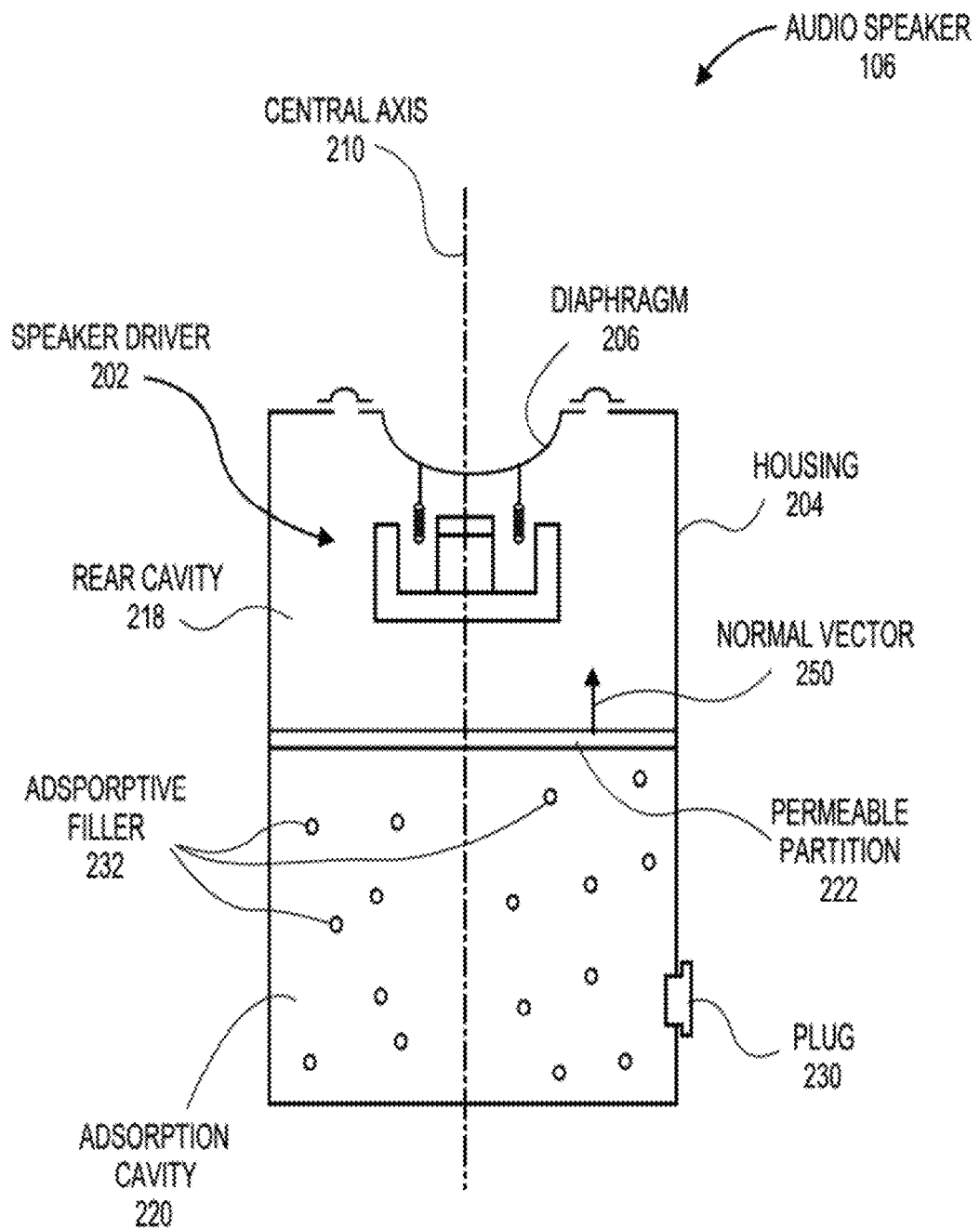

FIGS. 2A-2B illustrate aspects of an audio speaker of an electronic device. In an aspect, an audio speaker 106 includes an enclosure, such as a speaker housing 204, which supports a speaker driver 202. Speaker driver 202 can be a loudspeaker used to convert an electrical audio signal into a sound. For example, speaker driver 202 can be a micro speaker having a diaphragm 206 supported relative to housing 204 by a speaker surround 208. Speaker surround 208 can flex to permit axial motion of diaphragm 206 along a central axis 210. For example, speaker driver 202 can have a motor assembly attached to diaphragm 206 to move diaphragm 206 axially with piston-like motion, i.e., forward and backward, along central axis 210. The motor assembly can include a voice coil 212 that moves relative to a magnetic assembly 214. In an aspect, magnetic assembly 214 includes a magnet, such as a permanent magnet, attached to a top plate at a front face and to a yoke at a back face. The top plate and yoke can be formed from magnetic materials to create a magnetic circuit having a magnetic gap within which voice coil 212 oscillates forward and backward. Thus, when the electrical audio signal is input to voice coil 212, a mechanical force can be generated that moves diaphragm 206 to radiate sound forward along central axis 210 into a surrounding environment outside of housing 204.

Movement of diaphragm 206 to radiate sound forward toward the surrounding environment can cause sound to be pushed in a rearward direction. For example, sound can propagate through a gas filling a space enclosed by housing 204. More particularly, sound can travel through air in a back volume 216 behind diaphragm 206. Back volume 216 can influence acoustic performance. In particular, the size of back volume 216 can influence the natural resonance peak of audio speaker 106. For example, increasing the size of back volume 216 can result in the generation of louder bass sounds.

In an aspect, back volume 216 within housing 204 can be separated into several cavities. For example, back volume 216 can be separated by a permeable partition 222 into a rear cavity 218 and an adsorption cavity 220. Rear cavity 218 can be located directly behind speaker driver 202. That is, speaker driver 202 can be suspended or supported within rear cavity 218 so that sound radiating backward from diaphragm 206 propagates directly into rear cavity 218. Accordingly, at least a portion of rear cavity 218 can be defined by a rear surface of diaphragm 206, and similarly, by a rear surface of speaker surround 208. Furthermore, given that permeable partition 222 can extend across a cross-sectional area of back volume 216 between several walls of housing 204, rear cavity 218 can be further defined by an internal surface of housing 204 and a first side 224 of permeable partition 222.

Back volume 216 can include adsorption cavity 220 separated from rear cavity 218 by permeable partition 222—i.e., adsorption cavity 220 can be adjacent to rear cavity 218 on an opposite side of permeable partition 222. In an aspect, adsorption cavity 220 is defined by an internal surface of housing 204 that surrounds back volume 216, and can also be defined by a second side 226 of permeable partition 222. Thus, rear cavity 218 and adsorption cavity 220 can be immediately adjacent to one another across permeable partition 222.

In an aspect, adsorption cavity 220 can be placed in fluid communication with the surrounding environment through a fill port 228. For example, fill port 228 can be a hole through a wall of housing 204 that places adsorption cavity 220 in fluid communication with the surrounding environment. The port can be formed during molding of housing 204, or through a secondary operation, as described further below. To isolate adsorption cavity 220 from the surrounding environment, a plug 230 can be located in fill port 228, e.g., after filling adsorption cavity 220 with an adsorptive filler 232, to prevent leakage of the adsorptive filler 232 into the surrounding environment. Thus, adsorption cavity 220 can be partially defined by a surface of plug 230.

Audio speaker 106 can have a form factor with any number of shapes and sizes. For example, audio speaker 106, and thus housing 204, can have an external contour that appears to be a combination of hexahedrons, cylinders, etc. One such external contour could be a thin box, for example. Furthermore, housing 204 can be thin-walled, and thus, a cross-sectional area of a plane passing across housing 204 at any point can have a geometry corresponding to the external contour, including rectangular, circular, and triangular, etc. Accordingly, permeable partition 222 extending across back volume 216 within housing 204 can also have a variety of profile shapes. For example, in the case where audio speaker 106 is a hexahedron, e.g., a low-profile box having a rectangular profile extruded in a direction orthogonal to central axis 210, permeable partition 222 can have a rectangular profile.

Adsorptive filler 232 can be packaged in adsorption cavity 220 by directly filling, e.g., packing, adsorption cavity 220 with a loose adsorptive material and/or by coating inner surfaces of housing 204 with an adsorptive material. Directly filling adsorption cavity 220 can be distinguished from indirectly filling adsorption cavity 220 in that the loose adsorptive material can be poured, injected, or other transferred into adsorption cavity 220 in a loose and unconstrained manner such that the adsorptive material can move freely within adsorption cavity 220. That is, the adsorptive material can be constrained only by the walls that define adsorption cavity 220, e.g., an inner surface of housing 204, and not by a separate constraint, e.g., a bag, pouch, box, etc. that is filled with adsorptive material prior to or after inserting the separate constraint into adsorption cavity 220. In an aspect, at least a portion of the space of adsorption cavity 220 is filled with adsorptive filler 232, and at least a portion of an inner surface of housing 204 within adsorption cavity 220 is covered by adsorptive filler 232. The adsorptive filler 232 can be any appropriate adsorptive material that is capable of adsorbing a gas located in back volume 216. For example, adsorptive filler 232 can include an adsorptive material such as zeolite beads described below in connection with FIG. 4A et seq., which are configured to adsorb air molecules. The adsorptive material can be in a loose granular form. More particularly, the adsorptive filler 232 can include unbound particles that are able to move freely within adsorption cavity 220, e.g., the particles can shake around during device use. Thus, permeable partition 222 can act as a barrier to prevent adsorptive filler 232 from shaking out of adsorption cavity 220 into rear cavity 218 behind speaker driver 202.

FIG. 2B illustrates another aspect of an audio loudspeaker of an electronic device. Rear cavity 218 and adsorption cavity 220 can have different relative orientations in various aspects. For example, in the aspect shown in FIG. 2A, adsorption cavity 220 is located lateral to rear cavity 218, i.e., is laterally offset from rear cavity 218 away from central axis 210. As a result, sound emitted rearward from diaphragm 206 can propagate directly toward a rear wall of rear cavity 218, rather than be radiated directly toward permeable partition 222.

But in the aspect shown in FIG. 2B, audio speaker 106 includes axially arranged back volume 216 cavities. For example, adsorption cavity 220 can be located directly behind rear cavity 218, so that central axis 210 can intersect rear cavity 218 behind diaphragm 206 and adsorption cavity 220 on an opposite side of permeable partition 222. Accordingly, permeable partition 222 can cross back volume 216 along a plane such that normal vector 250 emerging from first side 224 and pointing into rear cavity 218 is oriented in a direction that is parallel to central axis 210. For example, rear cavity 218 and adsorption cavity 220 can each be flat and thin and positioned forward-and-behind along central axis 210. Thus, sound emitted rearward by diaphragm 206 can propagate along central axis 210 directly through rear cavity 218 and permeable partition 222 into adsorption cavity 220.

Permeable partition 222 can be oriented at any angle relative to central axis 210. That is, although first face can face a direction orthogonal to, or parallel to, central axis 210, in an aspect, permeable partition 222 is oriented at an oblique angle relative to central axis 210. Thus, adsorption cavity 220 can be some combination of lateral to, or directly behind, adsorption cavity 220 within the scope of this description. In any case, rear cavity 218 and adsorption cavity 220 can be adjacent to one another such that opposite sides of permeable partition 222 define a portion of each cavity.

Figure 3:
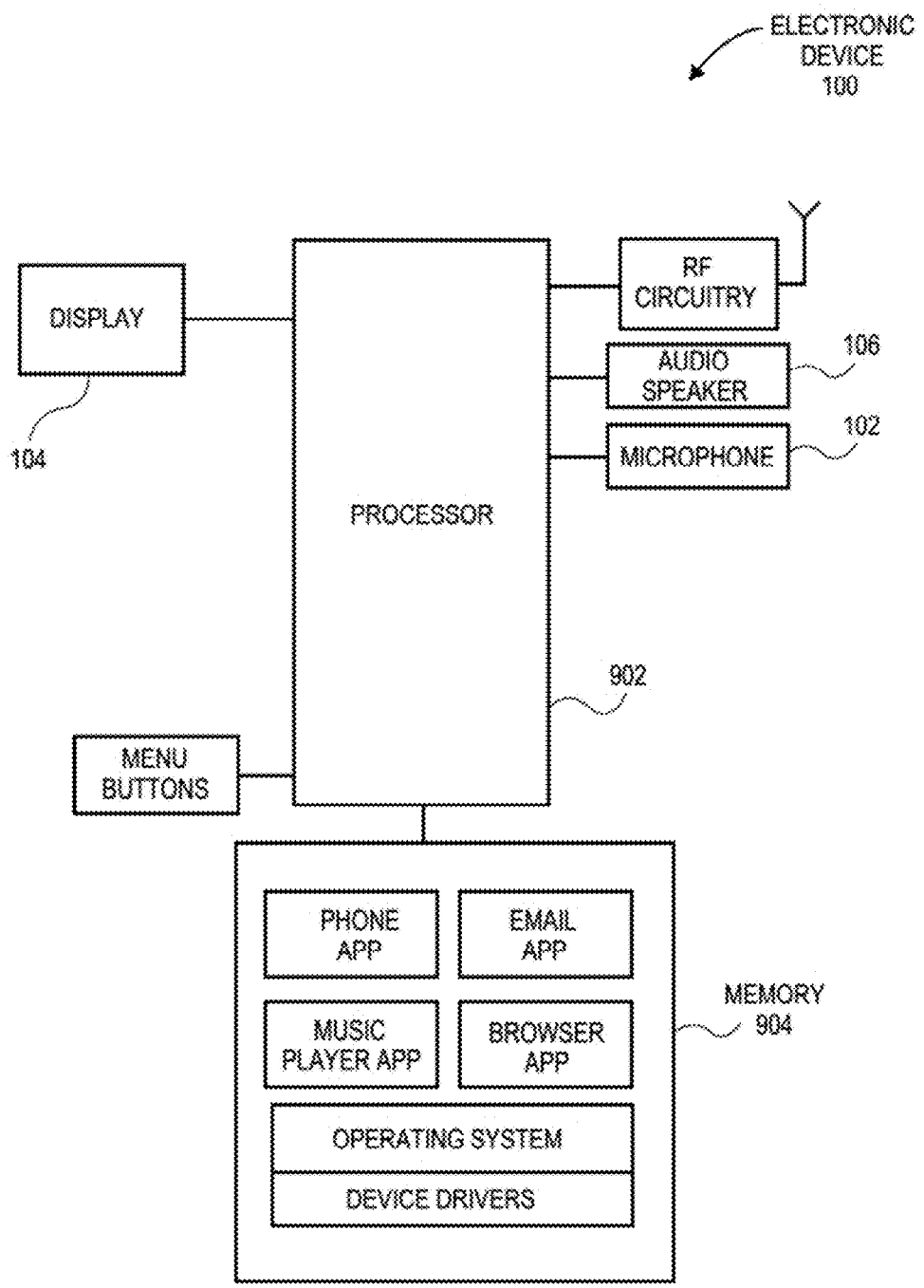
FIG. 3 is a schematic of an aspect of an electronic device including an aspect of an audio micro-speaker such as the ones shown in FIGS. 2A-2B.

FIG. 3 schematically illustrates an aspect of an electronic device that includes a micro speaker. As described above, electronic device 100 can be one of several types of portable or stationary devices or apparatuses with circuitry suited to specific functionality. Thus, the diagrammed circuitry is provided by way of example and not limitation. Electronic device 100 can include one or more processors 902 that execute instructions to carry out the different functions and capabilities described above. Instructions executed by the one or more processors 902 of electronic device 100 can be retrieved from local memory 904, and can be in the form of an operating system program having device drivers, as well as one or more application programs that run on top of the operating system, to perform the different functions introduced above, e.g., phone or telephony and/or music play back. For example, processor 902 can directly or indirectly implement control loops and provide drive signals to voice coil 212 of audio speaker 106 to drive diaphragm 206 motion and generate sound.

Audio speaker 106 with the structure described above can include back volume 216 separated by an acoustically transparent barrier, e.g., permeable partition 222, into two cavities: rear cavity 218 directly behind speaker driver 202 and adsorption cavity 220 adjacent to rear cavity 218 across permeable partition 222. Furthermore, adsorption cavity 220 can be directly filled with an adsorptive material such that back volume 216 includes an adsorptive volume defined directly between a system housing 204 and the acoustically transparent barrier. The adsorptive volume can reduce the overall spring rate of back volume 216 and lower the natural resonance peak of audio speaker 106. That is, adsorptive filler 232 can adsorb and desorb randomly traveling air molecules as pressure fluctuates within back volume 216 in response to a propagating sound. As a result, audio speaker 106 can have a higher efficiency at lower frequencies, as compared to a speaker having a back volume 216 without adsorptive material. Thus, the overall output power of audio speaker 106 can be improved. More particularly, audio speaker output can be louder during telephony or music play back, especially within the low-frequency audio range. Accordingly, audio speaker 106 having the structure described above can produce louder, richer sound within the bass range using the same form factor as a speaker back volume without multiple cavities, or can produce equivalent sound within the bass range within a smaller form factor. Furthermore, because adsorption cavity 220 is defined directly between housing 204 and permeable partition 222, which are sealed together, the form factor of audio speaker 106 can be smaller than, e.g., a speaker back volume that holds a secondary container, e.g., a mesh bag, filled with an adsorbent material.

Zeolitic Beads

Figure 4A:
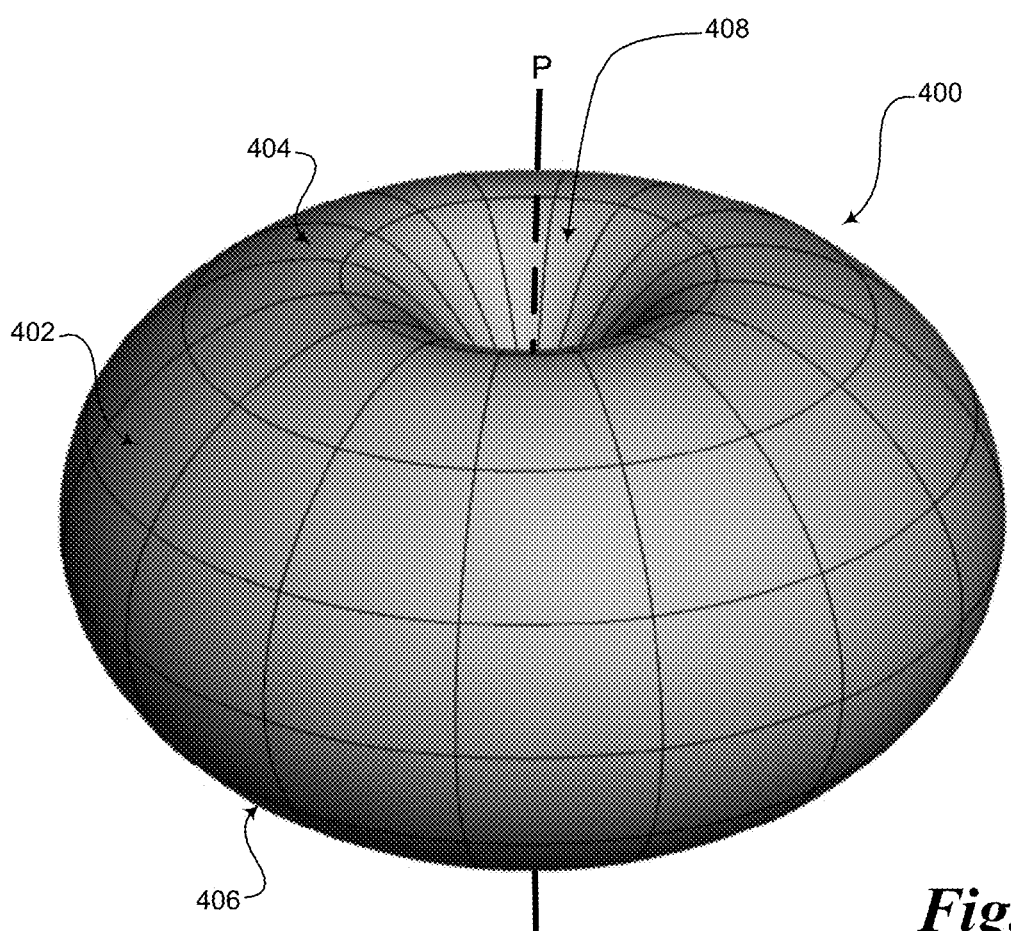
FIGS. 4A-4D are views of an aspect of a zeolitic bead that can be used in the back volume of an audio micro-loudspeaker such as the ones shown in FIGS. 2A-2B.
Figure 4B:
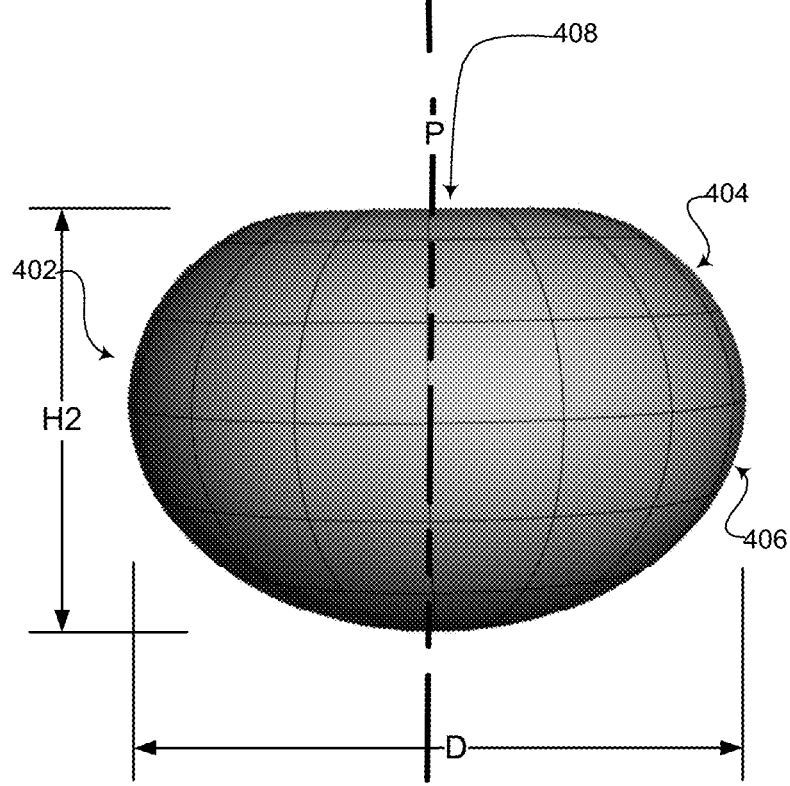
Figure 4C:
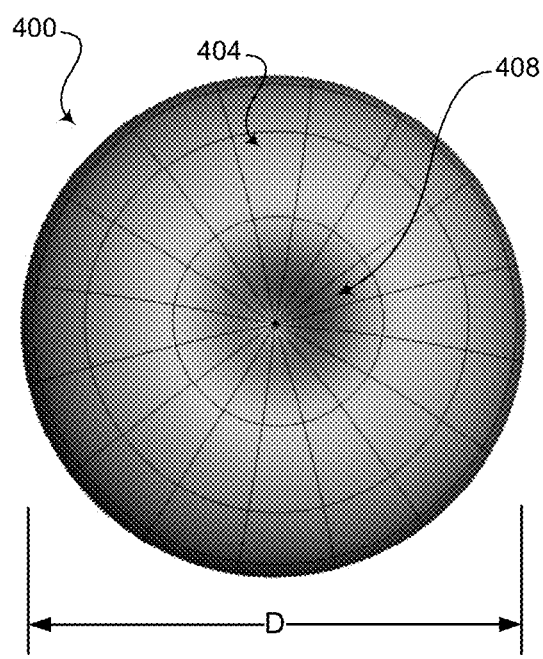
Figure 4D:
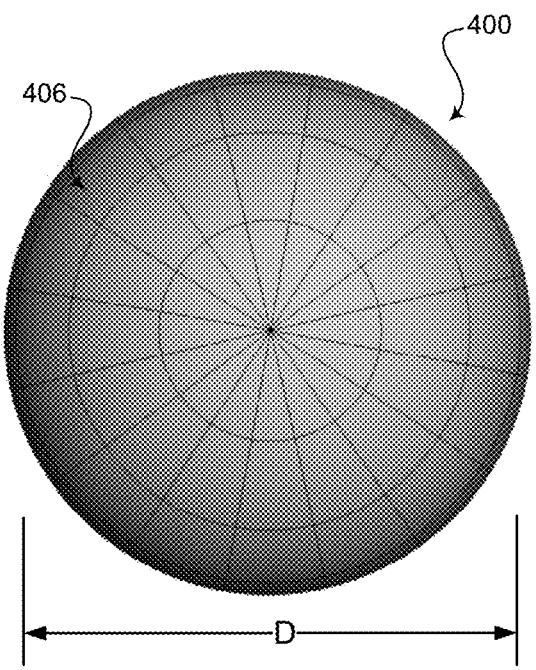

FIGS. 4A-4D together illustrate an aspect of a zeolitic bead 400 that can be used, for instance, as at least part of an assemblage of beads in the back volume of a micro-loudspeaker such as the ones shown in FIGS. 2A-2B. FIG. 4A is a perspective view, FIG. 4B a side view, and FIGS. 4C-4D top and bottom views. As used herein, a zeolitic material is understood to be a material comprising a Zeolite as the main component working as an adsorbent material. A non-exhaustive list of Zeolites is given by the International Zeolite Association at http://www.iza-structure.org. Thus, not only pure microporous alumosilicates but also microporous, crystalline materials containing for example Germanium or other elements are considered to be Zeolites.

Bead 400 is a porous solid having a domed top part 404 joined to a domed bottom part 406, with the domed surfaces of top part 404 and bottom part 406 forming the bead's outer surface 402. Bead 400 has a polar axis P, a polar dimension H2 in a direction substantially parallel to polar axis P, and transverse dimension or transverse diameter D normal to the polar axis. The shape of bead 400 can be thought of as a shape with two components: a base shape made up of domed top part 404 and domed bottom part 406, and a depression or indentation 408 formed in domed top part 406 substantially at one pole and substantially along polar axis P and directed toward the center of the base shape (see FIGS. 5A-5B). Although in the illustrated aspect bead 400 is axisymmetric about polar axis P, in other aspects bead 400 need not be exactly axisymmetric. Note that, as used herein, "top" and "bottom" refer to the orientation of the bead shown in the figure, but do not require any particular orientation of bead 400 when in use.

Bead 400 is generally shaped like a spheroid—i.e., a body that is sphere-like but need not be perfectly spherical. In the illustrated aspect, the base shape of bead 400 (i.e., the shape without taking the indentation into account) is an oblate spheroid—that is, a solid of revolution obtained by rotating an ellipse about its minor axis. In an oblate spheroid, domed top part 404 and domed bottom part 406 would be substantially the same—both would be similar or identical oblate hemispheroids. In an aspect where the base shape is an oblate spheroid, the morphology of the resulting shape once the indentation is formed can be described various ways—for instance as a mushroom cap, a toadstool cap, a three-dimensional cardioid, etc.

Figure 5A:
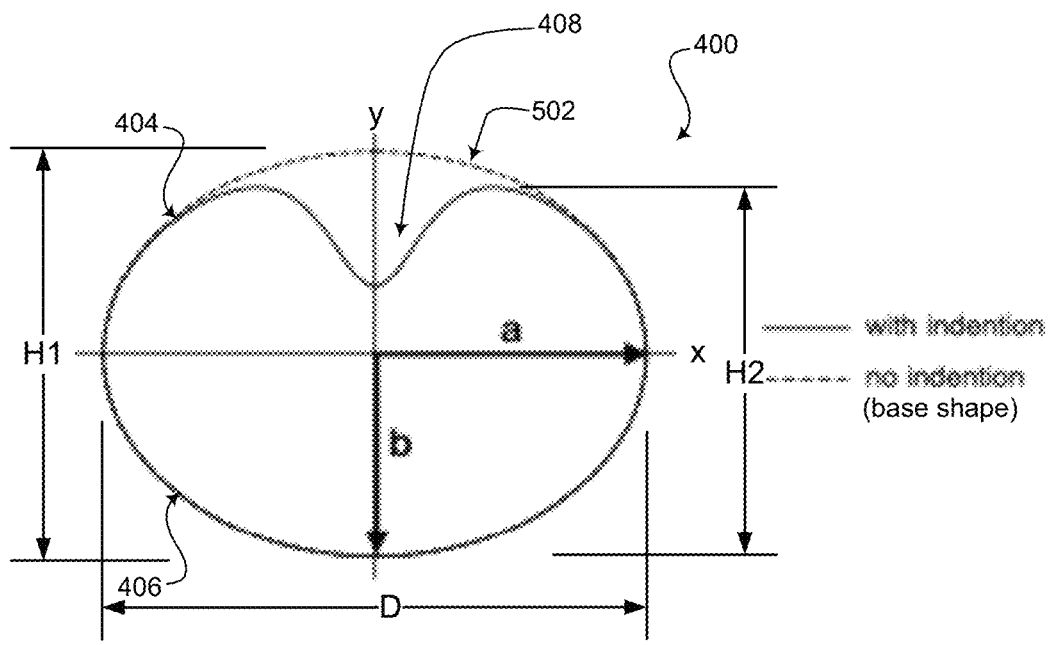
FIGS. 5A-5B are cross-sectional views of an aspect of a zeolitic bead.

In the illustrated aspect, bead 400 has an overall transverse dimension or transverse diameter D, which in an oblate spheroid corresponds to the length of the major axis (D=2a, see FIG. 5A), and has an overall polar dimension or polar height H2 (H2=2b, see FIG. 5A). Overall polar dimension or polar height H2 will generally be less than the overall polar dimension or polar height H1 of the base shape (i.e., H2 is less than the length H1 of the minor axis, see FIG. 5A) because of indentation 408. In aspects of an assemblage of beads that includes multiple beads 400, the beads can have an average transverse diameter D between 140 μm and 400 μm, between 250 μm and 320 μm, or between 280 μm and 300 μm. Similarly, in various aspects an assemblage of beads can have an average polar dimension or polar height H2 between 0.5 H1 and 0.95 H1.

In other aspects, however, the base shape of bead 400 can be something other than an oblate spheroid. For instance, in other aspects domed top part 404 and domed bottom part 406 need not be identical domed shapes. In one aspect, for instance, domed top part 404 and domed bottom part 406 could have the same transverse dimensions but different polar dimensions. Even with a domed top part 404 and a domed bottom part 406 that are not identical, the resulting shape with the indentation can still have a mushroom-cap-like morphology.

Figure 5B:
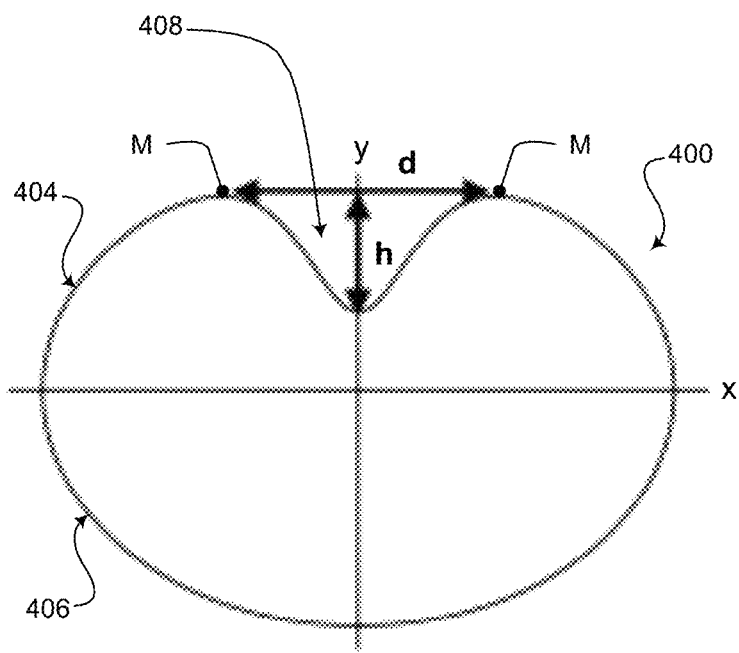

FIGS. 5A-5B together illustrate an aspect of an idealized cross-section of a bead 400. When rotated about polar axis P (corresponding to the y axis in the figures), the illustrated cross-section forms the three-dimensional bead shape shown in FIGS. 4A-4D.

As previously described, bead 400 has a transverse dimension or transverse diameter D and an overall polar dimension or polar height H2. The bead's base shape without indentation 408 has an overall polar dimension or polar height H1, which because of indentation 408 will generally be greater than the final bead's overall polar dimension or polar height H2. In a bead that is substantially round as seen from the top and bottom, transverse dimension or transverse diameter D can be its maximum diameter. In the illustrated aspect the base cross-sectional shape is an ellipse, so that D is the major diameter (i.e., the length of the major axis, or substantially twice the major radius, D=2a) and H1 is the minor diameter (i.e., the length of the minor axis, of substantially twice the minor radius, H1=2b). In various aspects, the aspect ratio H1/D of the base shape can vary between 0.5 and 0.75. In various aspects of an assemblage including a plurality of beads 400, the beads in the assemblage can have an average transverse dimension or transverse diameter D between 140 μm and 400 μm, between 250 μm and 320 μm, or between 280 μm and 300 μm. Also in various aspects of an assemblage of a plurality of beads 400, the beads can have an average polar dimension or polar height H2 between 0.5 H1 and 0.95 H1.

Indentation or depression 408 is formed along polar axis P (corresponding to the y axis in FIGS. 5A-5B) in top domed part 404. Indentation 408 has a width d, measured normal to polar axis P between the maxima M of top domed part 404 on either side of the depression, and a depth h measured parallel to polar axis P from a line joining maxima M to the bottom of the indentation. In one aspect, depth h can be between 5% and 50% of polar dimension or polar diameter H1 (i.e., from 10% to 100% of dimension b), while width d can be from 5% to 35% of transverse dimension or transverse diameter D (e.g., from 10% to 70% of dimension a). In still other aspects, the method aspects described below easily enable production of beads 400 with indentations in which depth h can be between 5% and 35% of polar dimension or polar diameter H1 (i.e., from 10% to 70% of dimension b), while width d can be from 5% to 25% of transverse dimension or transverse diameter D (e.g., from 10% to 50% of dimension a).

The appearance and the cross section of an idealized mushroom cap-like bead as shown in FIGS. 5A-5B can be described mathematically by a revolutional parametric plot according to the equations:

$$x = \sin(t)$$

$$y = \alpha \cos(t) + fi(t)$$

where $0 \leq t \leq 2\pi$ and function $fi(t)$ is defined by:

$$\text{If } 0 \leq t \leq \frac{\pi}{2} \text{ OR if } 1.5\pi \leq t \leq 2\pi \text{ then } fi(t) = \frac{\iota}{((\sin(t))^2 + \delta)^2}$$

For all other values of t: $fi=0$

In this equation, parameter $\alpha$ determines the flattening of the ellipsoid which would be visible if no indention took place. More particularly, $\alpha$ is equal to the relation of the semi-minor axes b to the semi-major axes a of the ellipse as cross section if the indentation wasn't there—i.e., $\alpha=b/a$. Parameters $\iota$ and $\delta$ describe the depth and shape of indentation 408, and most important the depth d and the width w of the indention. In one aspect, parameters $\iota$ and $\delta$ have values of $\iota \approx -0.005$ and $\delta \approx 0.1$.

Zeolitic Bead Manufacturing Process

Figure 6:
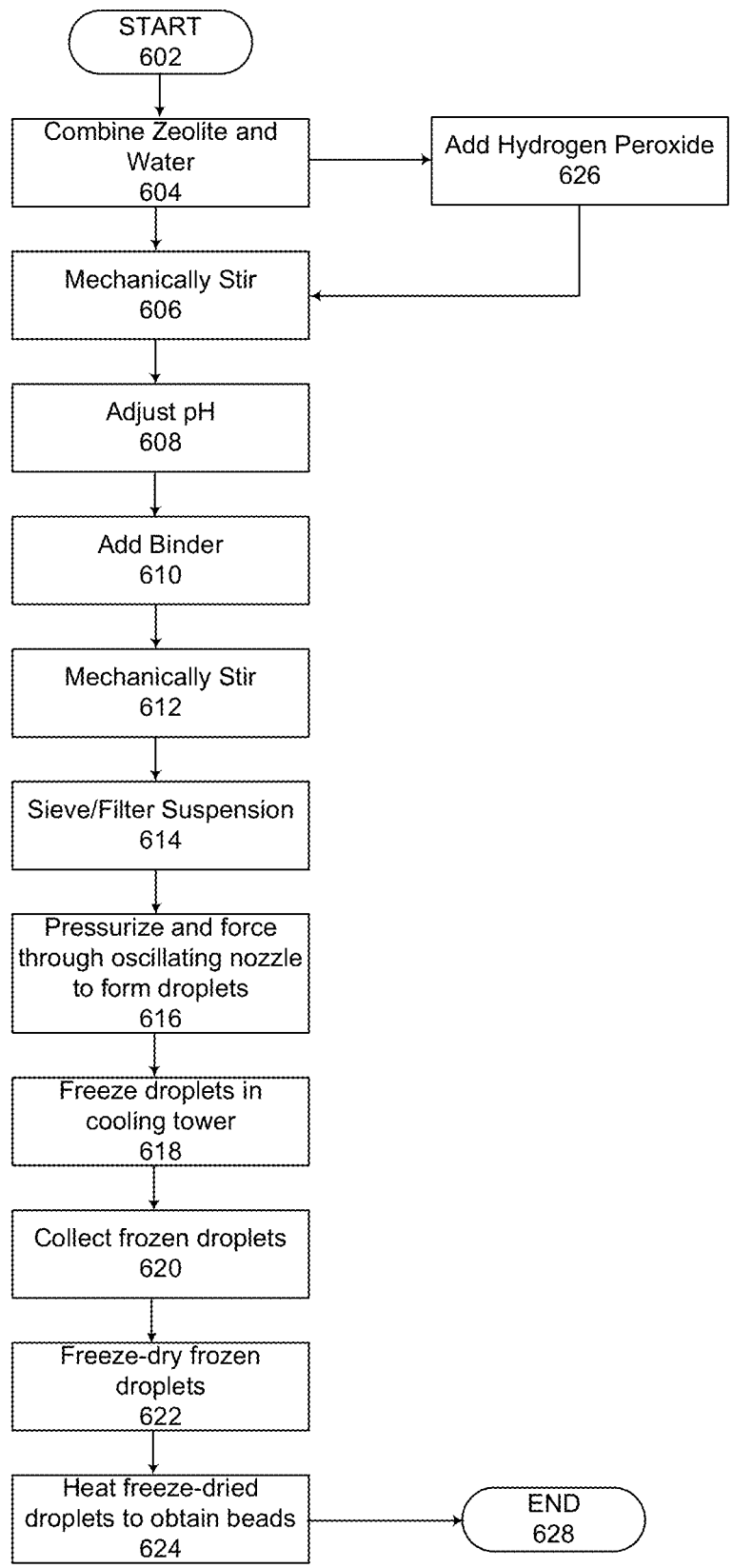
FIG. 6 is a flowchart of an aspect of a process for making zeolitic beads such as the one shown in FIGS. 4A-4D and 5A-5B.
Figure 7B:
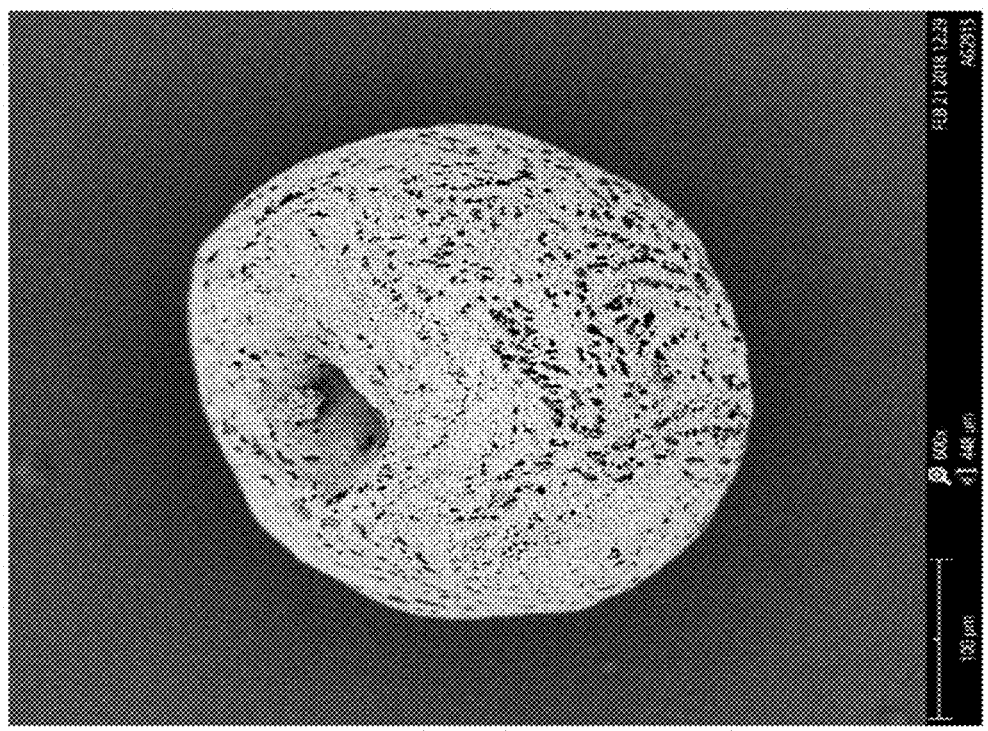
FIGS. 7A-7B are scanning electron microscope (SEM) photographs of an aspect of a zeolitic bead produced using an aspect of the disclosed method.
Figure 7A:
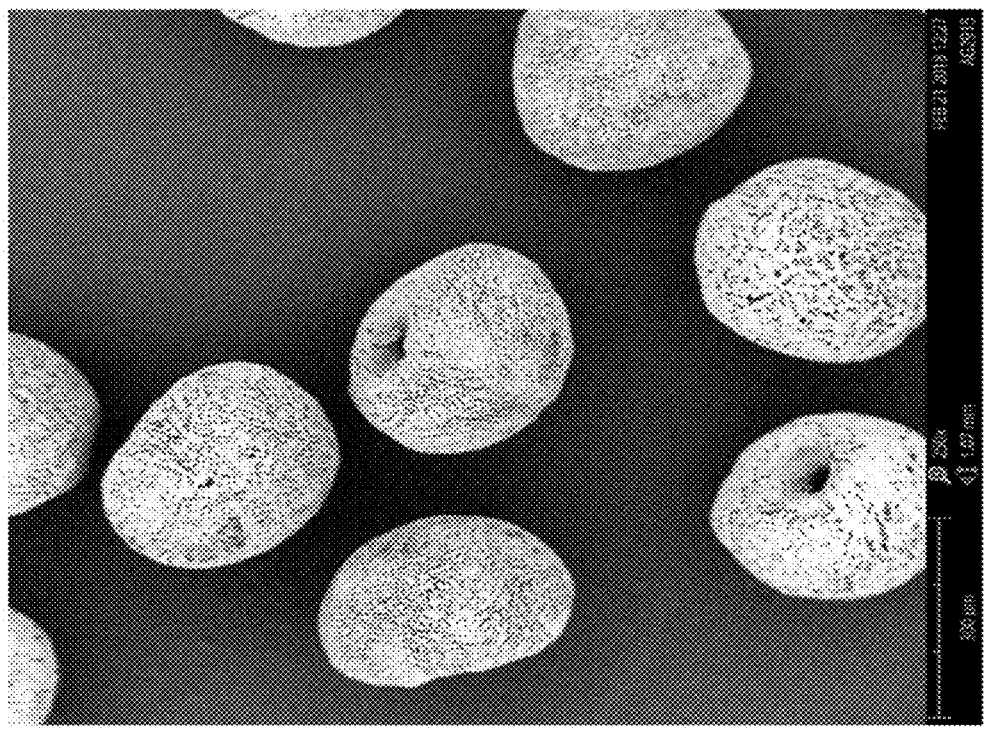
Figure 8B:
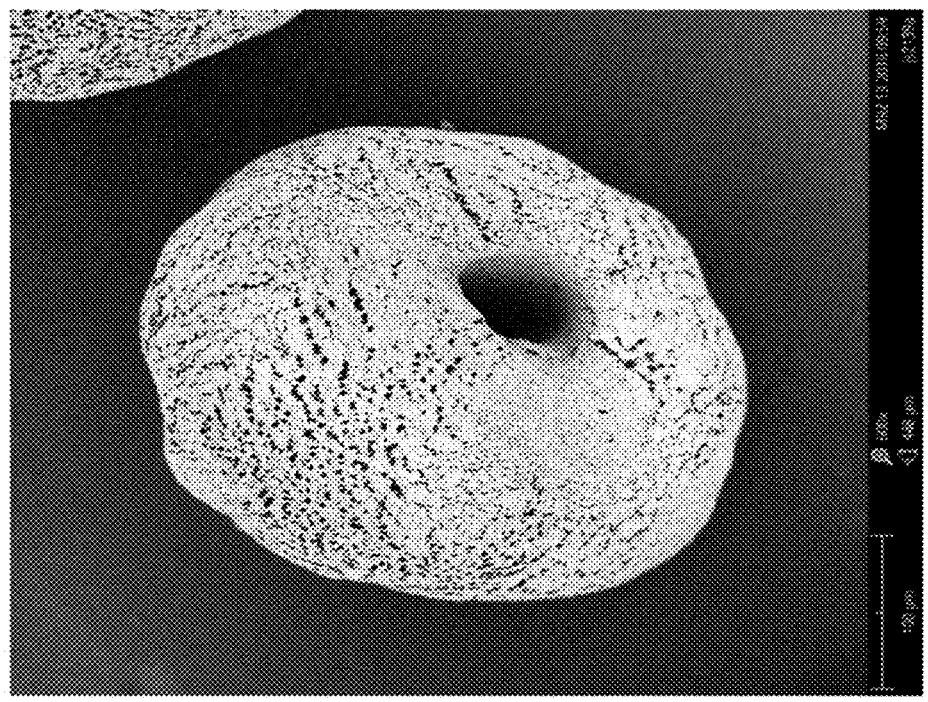
FIGS. 8A-8B are SEM photographs of an aspect of a zeolitic bead produced using an aspect of the disclosed method.
Figure 8A:
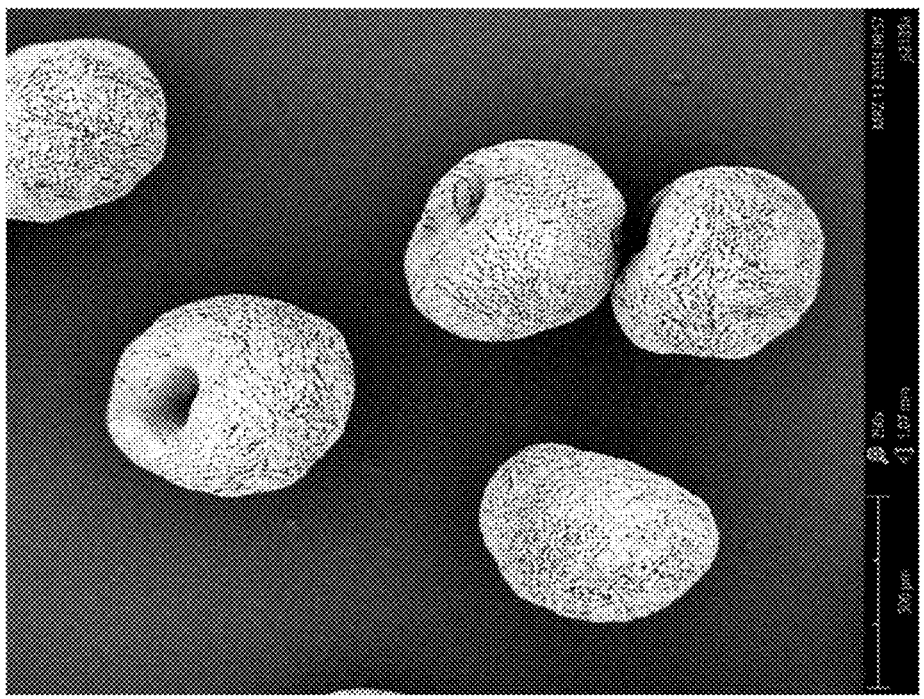

FIG. 6 illustrates an aspect of a process 600 for making beads 400. Beads 400 can be made by a process that includes:
  preparing an aqueous suspension of the zeolite, a polymeric binder, and hydrogen peroxide (H2O2);
  spraying the suspension through a nozzle to form droplets of the suspension;
  freezing the droplets; and
  freeze-drying the droplets—e.g., drying the frozen droplets by sublimation of ice at reduced pressure.

The process starts at block 602. At block 603, a zeolite is combined with water, which in one embodiment can be de-ionized (DI) water. At block 626, hydrogen peroxide (H2O2) is added to the mixture and at block 606 the mixture is mechanically stirred. At block 608, the pH of the mixture is adjusted, at block 610 a polymeric binder is added to the mixture, and at block 612 the mixture is again mechanically stirred. At block 614 the mixture is mechanically filtered or sieved, and at block 616 the filtered/sieved mixture is pressurized and forced through an oscillating nozzle to produce droplets of the mixture.

At block 618, the droplets emerging from the nozzle in block 616 are frozen by dropping them through a cooling tower. At block 620, the frozen droplets are collected from the cooling tower and at block 622 the frozen droplets are freeze-dried, for instance by subjecting them to a vacuum to cause any remaining water in the droplets to sublimate. At block 624, the freeze-dried droplets from block 622 are collected and heated to obtain the final beads. If block 626 is bypassed—i.e., the hydrogen peroxide is not added to the mixture—the result is high-density beads with a roundish (i.e., substantially round) shape. But if block 626 is not bypassed and the hydrogen peroxide is added to the mixture, the result is high-density beads with a mushroom-cap morphology, such as the ones shown in FIGS. 4A-4D and 5A-5B.

Details of specific aspects of process 600 are given in examples 1-6 below. The described process can be used to produce high-density zeolitic beads and, primarily through a modification of the aqueous suspension with hydrogen peroxide (H2O2), changes the shape of the beads to substantially the shape described above for FIGS. 4A-4D and 5A-5B.

Example 1

At block 604, into a 5 l plastic beaker containing 900 g of de-ionized (DI) water was added 1578 g of MFI (Si-to-Al ratio ca. 450), and at block 606 the mixture was mechanically stirred until all zeolite agglomerates disappeared. At block 608, an aqueous solution of KOH (4 mol/L) was added until the pH reached 9.0. The suspension was stirred for an hour and the pH was again adjusted to 9.0 with 4 M KOH solution. At block 610, a 40% w/w HB Fuller 1000-23 binder dispersion (250 g) was added slowly. At block 612, the suspension was stirred for one hour and at block 614 the suspension was sieved using a 50 μm mesh size sieve.

At block 616, the filtered suspension was transferred into a 5 L glass vessel, pressurized with air to 1.3 bar, and dropped through an oscillating nozzle with a 140 μm diameter, powered by an amplifier connected to a function generator. With the help of a stroboscope, the flow and the oscillation frequency were adjusted so that the laminar fluid jet streaming out of the nozzle cleanly decayed into separate droplets. At block 618, the droplets were falling into a cooling tower of ca. 3 meters height, cooled continuously by a mixture of nitrogen and air to a temperature in the top of −20±5° C. and in the bottom of −50±5° C.

At block 620, the frozen beads were collected in a round-bottom flask that was precooled to about −20° C. At block 622, a vacuum of less than 300 Pa was applied, until the water (ice) was completely removed from the beads by sublimation, thus freeze drying the particles.

At block 624, the beads were collected on a steel tray and heated in a forced convection air oven to a temperature of 120° C. After reaching this temperature, the beads were kept in the oven for two hours and then cooled. After cooling the beads were sieved and packed. The beads obtained were of roundish shape and performed in the acoustics test as given in the Table 1.

Example 2

The beads were prepared according to the procedure described for Example 1, but HB Fuller 1000-34 binder was used at block 610 instead of HB Fuller 1000-21 binder. The beads obtained were of roundish shape and performed in the acoustics test as given in the Table 1.

Example 3

The beads were prepared according to the procedure described for Example 2, but at block 606 the suspension of MFI in DI water before the addition of KOH solution at block 608 was subjected to heating in an autoclave at 205° C. for 24 hours and subsequent cooling to ambient temperature in order to make the surface of the zeolite more hydrophilic. The beads finally obtained in this example were of roundish shape and performed in the acoustics test as shown in Table 1 below.

Example 4

The beads were prepared according to the procedure described for Example 2, but the temperature of the cooling tower at block 618 was set to −60±5° C. in the top and of −80±5° C. in the bottom. The beads obtained were of roundish shape and performed in the acoustics test as shown in Table 1.

Example 5

The beads were prepared according to the procedure described for Example 1, but at blocks 604 and 626, instead of 900 g of deionized (DI) water, 880 g of DI water premixed with 20 g of 35% aqueous H2O2 was used. The beads obtained at block 624 were of mushroom cap-like shape as shown in FIGS. 7A-7B and 8A-8B and performed in the acoustics test as shown in Table 1.

Example 6

The beads were prepared according to the procedure described for Example 5, but at block 610 HB Fuller LA1127-23 binder was used instead of HB Fuller 1000-23 binder.

Measurements and Results

Scanning Electron Microscopy

The Scanning Electron Micrographs (SEMs) of FIGS. 6A-6B and 7A-7B were recorded on a Phenom Pro (Phenom World B.V.) SEM with a variable magnification and acceleration voltage of 5 kV.

Acoustic Measurements

The resonance frequencies of loudspeakers were determined by measuring the frequency-dependent electrical impedance and its phase, respective its zero crossing. A Klippel Distortion Analyser II (Klippel GmbH) was connected to a standard personal computer, and a PLX 1104 amplifier (QSC Corp.). A Donau-type loudspeaker (Knowles Corporation) was attached to a back cavity with ca. 1 ml volume and geometric dimensions of 0.90×1.30×0.85 (cm$^3$). For beads of diameter larger than 350 μm, the cavity was completely filled with beads. For beads with a diameter smaller than 350 μm, a volume of 0.24 cm$^3$ was filled.

Density Measurements

For samples reported in Table 1 below, the bead density was measured by filling of a graduated cylinder 5 mm in diameter and determining the occupied volume. The beads were then weighed and their density calculated in the usual way.

Results

By changing the fraction of the zeolite to the polymeric binder and water in the aqueous suspension, the density of the final beads can be adjusted in a wide range. Currently-used beads have a bulk density of about 410 kg/m3, resulting from an overall mass fraction of the zeolite in the aqueous suspension of about 46% and a mass fraction of the binder of about 4%. Experiments showed that the solid matter content in the suspension can be increased to about 60% without interfering with droplet formation. Solid content higher than 60% generally leads to excessive suspension viscosity, making it difficult or impossible to pass it through the nozzle, e.g., droplet formation is hindered.

The beads made with a 60% solid content possess a higher bulk density of about 510 kg/m3. But the acoustic damping behavior of the loudspeaker modules equipped with such beads of a diameter of ca. 375 μm was higher than with the beads of a lower bulk density, reflecting higher internal frictional losses. That is a serious drawback. Generally, for battery-driven devices most of the electrical energy provided to the loudspeaker should be converted into acoustical energy and not lost as heat, in order to conserve the battery run time.

Although the increase in solid content of the aqueous suspension from 50% to 60% represents a 20% increase, in numerous experiments it was generally observed that such an increase resulted in an even higher increase in the bulk density of the dried beads. This was attributed to smaller expansion of a droplet with a lower water content. The higher the water content of a droplet, the higher the volume expansion during the freezing, because when frozen water expands in volume by about 9%.

For the beads made from the suspension of higher solid content, the resonance acoustic shift is approximately the same as for the currently commercially available beads. The values for the damping and resonance shift are depicted in Table 1 below and impedance curves are shown in FIG. 9.

TABLE 1

Comparison of beads with different densities.

Figure 9:
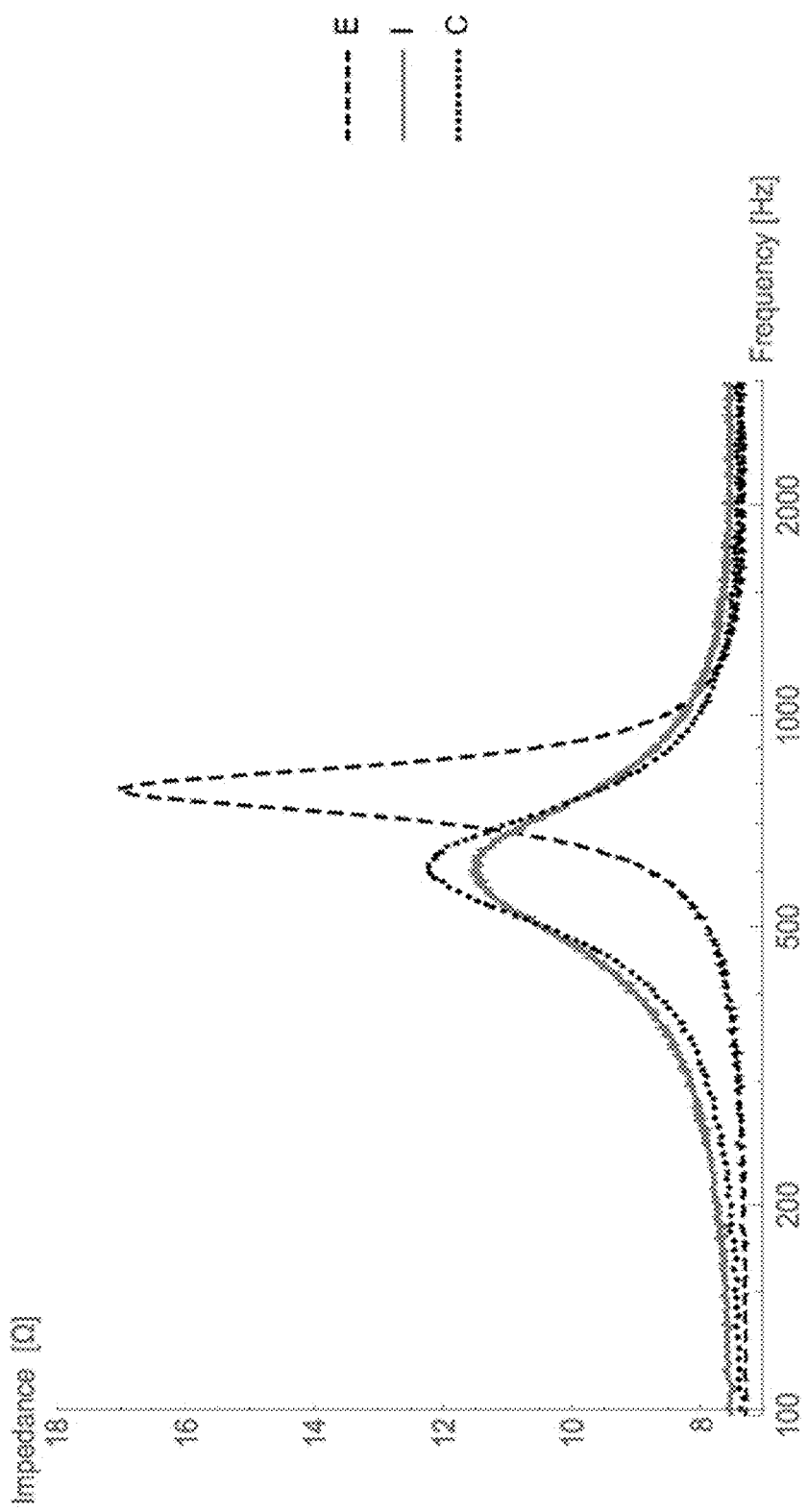
FIG. 9 is a graph illustrating the resonance frequency shift produced in an audio micro-loudspeaker using disclosed aspects of zeolitic beads.

| Back Volume Configuration | Density 2 [kg/m³] | $F_0$ [Hz] | $F_0$ Shift [Hz] | Damping RMS/MMS [$10^{-4}$ sec] | Legend in FIG. 9 |
|---|---|---|---|---|---|
| Empty | — | 782 | — | 11.90 | E |
| Beads with increased Density | 513 | 601 | 181 | 4.96 | I |
| Commercially available beads | 410 | 606 | 176 | 6.13 | C |

An attempt was made to improve the acoustic performance by reducing the average diameter of the beads to thereby shorten the average pathway of air molecules inside the beads. The twofold reduction of the bead radius shortens by half the longest pathway of an air molecule to a zeolite crystal. Also, a sphere with a half of a diameter possesses a doubled surface-to-volume ratio, which facilitates entry of air.

In some cases the decrease of average bead diameter resulted in a better acoustic performance, with the additional advantage that the smaller beads can better fill gaps and wrinkles in a given back volume geometry, thus further increasing the overall amount of zeolite in the back volume. But a disadvantage of the smaller beads is that the overall penetration depth of sound waves into the bead bed is significantly reduced due to higher streaming resistance. This is known by specialists skilled in the art and is mathematically described by the Ergun equation. So if the bed depth is increased, the advantages of smaller beads are, to a significant extent, lost.

Unexpectedly, it was found that adding a small amount of hydrogen peroxide (H2O2) to the suspension leads to an improved acoustic performance of the beads. The shape of beads resulting from the dripping process is not round, but rather of a mushroom cap such as shown in FIGS. 4A-4D and 5A-5B. SEM pictures showing the morphology of the obtained beads are given in FIGS. 7A-7B and 8A-8B.

An explanation for the improved acoustical performance by the mushroom cap-like morphology might be that the surface of each bead in relation to its volume is increased, thus facilitating the transport of air molecules to the individual zeolite crystals or the mean pathway of air molecules inside a bead is diminished.

This way, it has been possible to increase the bulk density of the beads while keeping the bead diameter at a moderate level of 224 to 315 μm, thus facing only a moderate increase in the streaming resistance compared to the currently-used beads of 375 μm average diameter, and to maintain a moderate level of acoustic damping. A comparison between the roundish and the mushroom cap-like beads can be found in Table 2, below. Note that bed depths recorded for these samples were lower than for the samples depicted in Tab. 1, details are given in the experimental section.

Looking at the different examples described above in detail, two different binders and slightly different processes were used. With no H2O2 present in the aqueous zeolite suspension, recorded F0 shifts for certain bead diameter only differed slightly at about 2.5% regardless the binder type or process variations. It was not possible to exceed an F0 Shift of 83 Hz for sieving fractions larger than 250 μm, e.g. fractions from 250 μm to 280 μm or 280 μm to 300 μm without the addition of H2O2. In contrast, samples made with the addition of H2O2 to the aqueous solution resulted in an increased F0 shift and a reduced damping.

TABLE 2

Comparison of Bead Size and Addition of H2O2

| Ex. No. | Fraction [μm] | Density [kg/m³] | $F_0$ Shift [Hz] | Damping MMS/RMS [$10^{-4}$ sec] | $H_2O_2$ | Morphology |
|---|---|---|---|---|---|---|
| Ex. 1 | 224-250 | 530 | 84 | 8.32 | No | Roundish |
|  | 250-280 | 530 | 81 | 8.0 | No | Roundish |
|  | 280-300 | 530 | 81 | 7.7 | No | Roundish |
| Ex. 2 | 224-250 | 500 | 83 | 8.6 | No | Roundish |
|  | 250-280 | 500 | 83 | 8.7 | No | Roundish |
|  | 280-300 | 500 | 83 | 8.5 | No | Roundish |
| Ex. 3 | 224-250 | 510 | 82 | 8.7 | No | Roundish |
|  | 250-280 | 510 | 82 | 8.5 | No | Roundish |
|  | 280-300 | 510 | 82 | 8.1 | No | Roundish |
| Ex. 4 | 224-250 | 510 | 83 | 8.5 | No | Roundish |
|  | 250-280 | 520 | 82 | 8.4 | No | Roundish |
|  | 280-300 | 520 | 81 | 8.3 | No | Roundish |
| Ex. 5 | 250-280 | 530 | 91 | 8.7 | Yes | Mushroom cap-like |
|  | 280-300 | 530 | 91 | 8.7 | Yes | Mushroom cap-like |

TABLE 2-continued

Comparison of Bead Size and Addition of H2O2

| Ex. No. | Fraction [μm] | Density [kg/m³] | $F_0$ Shift [Hz] | Damping MMS/RMS [$10^{-4}$ sec] | $H_2O_2$ | Morphology |
|---|---|---|---|---|---|---|
| Ex. 6 | 250-280 | 525 | 86 | 8.8 | Yes | Mushroom cap-like |
|  | 280-300 | 525 | 86 | 9.1 | Yes | Mushroom cap-like |

Summarizing, the values in Table 2 show that:

The highest F0 shift is observed for the mushroom cap-like beads.

The mushroom cap-like beads demonstrate lower damping for a given bead diameter.

A relation between damping and bead size is only visible when F0 shift is the same for different bead sizes, indicating a complex relationship between sorption and frictional losses.

For two of the four roundish bead samples, the smaller the beads, the higher is the F0 shift.

The formation of mushroom cap-like beads with the addition of hydrogen peroxide might be due to a complex interplay of changes in surface tension, viscosity, and density of the suspension, some or all of which could influence droplet formation during the dripping process. In particular, the amount of hydrogen peroxide sufficient to achieve the observed effect is remarkably low, possibly indicating a chemical reaction on the surface of one of the components present in the suspension.

As described by the Kozeny-Carman equation, an assemblage of beads with a smaller diameter exhibit a higher pressure drop across the assemblage than an assemblage of larger-diameter beads. On the other hand, especially in a loudspeaker, the pressure drop across the assemblage should be as low as possible, since the fixed bed should be accessible in bulk to high variations in the pressure of sound wave. In other words, in any given assemblage there is a tradeoff to be made between bead size and pressure drop.

The examples above that produce mushroom-cap beads, whose results are presented in Tables 1 and 2 and in the figures, produce beads with a diameter range between about 250 microns and about 300 microns. These sizes were chosen for the examples because they are in a range of bead sizes that provide good speaker performance. Nonetheless, the examples above can be modified—for instance, by varying the composition of the suspension or how the suspension is formed into droplets—to provide beads over other larger or smaller size ranges: 140 microns to 400 microns in some embodiments, 250 to 320 microns in other embodiments, and 280 to 300 microns in still other embodiments. Other ranges are also possible besides those listed. The ranges of width and depth of the bead depression mentioned above can also be achieved through process variations such as changing the concentration of peroxide. These ranges allow the performance of a bead assemblage to be tailored for many applications.

The above description of aspects is not intended to be exhaustive or to limit the invention to the described forms. Specific aspects of, and examples for, the invention are described herein for illustrative purposes, but various modifications are possible. To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An audio speaker comprising:
    a housing defining a back volume behind a speaker driver, wherein the speaker driver can convert an electrical audio signal into a sound so that the sound can propagate through a gas in the back volume;
    an adsorptive filler positioned in the back volume to adsorb the gas, the adsorptive filler comprising an assemblage of beads including a plurality of beads formed from a zeolite and a polymeric binder, wherein a non-zero percentage of beads in the plurality of beads has a shape including:
    a base shape having a continuous exterior formed of a first dome portion and a second dome portion, the first and second dome portions being joined together to form a spheroid with a polar axis, a polar dimension along the polar axis, and a transverse dimension normal to the polar axis; and
    an indentation formed in one of the first and second domed portions, the indentation having a depth extending toward a center of the base shape along, and in a direction of, the polar axis and a width in a direction normal to the polar axis,
    wherein the polar dimension is a polar diameter and the depth of the indentation is less than 10% of the polar diameter, or wherein the transverse dimension is a transverse diameter and the width of the indentation is between 5% and 35% of the transverse diameter.

2. The audio speaker of claim 1 wherein the first domed portion and the second domed portion are oblate hemispheroids, so that the base shape is an oblate spheroid.

3. The audio speaker of claim 2 wherein the first domed portions and the second domed portion have substantially a same transverse dimension but different polar dimensions.

4. The audio speaker of claim 1 wherein at least one bead in the assemblage of beads is shaped like a mushroom cap.

5. The audio speaker of claim 1 wherein at least one bead in the assemblage of beads is shaped like a three-dimensional cardioid.

6. The audio speaker of claim 1 wherein a cross sectional shape of at least one bead is described mathematically by the parametric equations:

$$x = \sin(t)$$

$$y = \alpha \cos(t) + fi(t)$$

wherein $0 \leq t \leq 2\pi$ and wherein $fi(t)$ is defined by:

If $0 \leq t \leq \frac{\pi}{2}$ OR if $1.5\pi \leq t \leq 2\pi$, then $fi(t) = \dfrac{\iota}{((\sin(t))^2 + \delta)^2}$ for all other values of t: $fi=0$;
wherein:
    parameter $\alpha = b/a$, wherein b is a minor radius and a is a major radius so that $\alpha$ determines a flattening of an ellipsoid without indentation, and
    parameters $\iota$ and $\delta$ describe the depth and shape of the indentation.

7. The audio speaker of claim 1 wherein the polar dimension is a polar diameter, and wherein the depth of the indentation is between 5% and 10% of the polar diameter.

8. The audio speaker of claim 1 wherein the transverse dimension is a transverse diameter, and wherein the width of the indentation is between 5% and 25% of the transverse diameter.

9. The audio speaker of claim 1 wherein the transverse dimension is a transverse diameter, and wherein the at least one bead has an average transverse diameter between 140 µm and 400 µm.

10. The audio speaker of claim 9 wherein the at least one bead has an average transverse diameter between 250 µm and 320 µm.

11. The audio speaker of claim 9 wherein the at least one bead has an average transverse diameter between 280 µm and 300 µm.

12. The audio speaker of claim 1 wherein the non-zero percentage is 50% or greater.

13. An audio speaker comprising:
a housing defining a back volume behind a speaker driver, wherein the speaker driver can convert an electrical audio signal into a sound so that the sound can propagate through a gas in the back volume;
an adsorptive filler positioned in the back volume to adsorb the gas, the adsorptive filler comprising an assemblage of beads including a plurality of beads formed from a zeolite and a polymeric binder, wherein a non-zero percentage of beads in the plurality of beads has a shape including:
a base shape having a continuous exterior formed of a first dome portion and a second dome portion, the first and second dome portions being joined together to form a spheroid with a polar axis, a polar dimension along the polar axis, and a transverse dimension normal to the polar axis, and
an indentation formed in one of the first and second domed portions, the indentation having a depth extending toward a center of the base shape along and in a direction of the polar axis and a width in a direction normal to the polar axis, wherein the polar dimension is a polar diameter and the depth of the indentation is between 5% and 50% of the polar diameter and the transverse dimension is a transverse diameter and the width of the indentation is between 5% and 35% of the transverse diameter.

14. The audio speaker of claim 13 wherein the polar dimension is a polar diameter, and wherein the depth of the indentation is between 5% and 10% of the polar diameter.

15. The audio speaker of claim 13 wherein the transverse dimension is a transverse diameter, and wherein the width of the indentation is between 5% and 25% of the transverse diameter.

16. The audio speaker of claim 13 wherein the transverse dimension is an transverse diameter, and wherein at least one bead has an average transverse diameter between 140 µm and 400 µm.

17. The audio speaker of claim 16 wherein the at least one bead has an average transverse diameter between 250 µm and 320 µm.

18. The audio speaker of claim 16 wherein the at least one bead has an average transverse diameter between 280 µm and 300 µm.

19. The audio speaker of claim 13 wherein the non-zero percentage is 50% or greater.

20. The audio speaker of claim 13, further comprising a permeable partition to divide the back volume into a rear cavity defined between the speaker driver, the housing, and the permeable partition and an adsorption cavity defined between the housing and the permeable partition, and wherein the permeable partition includes a plurality of holes that place the rear cavity in fluid communication with the adsorption cavity to allow the gas to flow between the rear cavity and the adsorption cavity.

21. The audio speaker of claim 20 wherein the plurality of holes are configured to prevent the adsorptive filler from passing between the adsorption cavity and the rear cavity.

22. The audio speaker of claim 13 wherein the speaker driver includes a diaphragm that moves along a central axis, and wherein a rear cavity is directly behind the diaphragm along the central axis.

23. The audio speaker of claim 22 wherein an adsorption cavity is laterally offset from the rear cavity away from the central axis or wherein the adsorption cavity is directly behind the rear cavity along the central axis.

24. An electronic device comprising:
an audio speaker comprising:
a housing defining a back volume behind a speaker driver, wherein the speaker driver can convert an electrical audio signal into a sound so that the sound can propagate through a gas in the back volume;
an adsorptive filler positioned in the back volume to adsorb the gas, the adsorptive filler comprising an assemblage of beads including a plurality of beads formed from a zeolite and a polymeric binder, wherein a non-zero percentage of beads in the plurality of beads has a shape including:
a base shape having a continuous exterior formed of a first dome portion and a second dome portion, the first and second dome portions being joined together to form a spheroid with a polar axis, a polar dimension along the polar axis, and a transverse dimension normal to the polar axis, and
an indentation formed in one of the first and second domed portions, the indentation having a depth extending toward a center of the base shape along and in a direction of the polar axis and a width in a direction normal to the polar axis, wherein the polar dimension is a polar diameter and the depth of the indentation is between 5% and 10% of the polar diameter, or wherein the transverse dimension is a transverse diameter and the width of the indentation is between 7 µm and 100 µm; and
a processor coupled to the audio speaker and to a memory, the memory having stored therein one or more application programs including instructions that, when executed by the processor, transmit signals to the audio speaker for transduction into sound.

25. The electronic device of claim 24 wherein the width of the indentation is between 5% and 25% of the transverse diameter.

26. The electronic device of claim 24 wherein at least one bead has an average transverse diameter between 140 µm and 400 µm.

27. The electronic device of claim 26 wherein the at least one bead has an average transverse diameter between 250 µm and 320 µm or the at least one bead has an average transverse diameter between 280 µm and 300 µm.

28. The electronic device of claim 24 wherein the non-zero percentage is 50% or greater.

29. The electronic device of claim 24 wherein the electronic device is a smartphone, a tablet, or a laptop computer.

30. The electronic device of claim 24, further comprising:
a microphone coupled to the processor;
radio frequency (RF) circuitry coupled to the processor; or
a display coupled to the processor.

31. The audio speaker of claim 1 wherein the plurality of beads is configured to adsorb a gas.

\* \* \* \* \*